June 4, 1940.  A. G. GURRIES  2,203,616
SPREADING AND GRADING ATTACHMENT FOR SCRAPERS
Filed March 31, 1939  2 Sheets-Sheet 1
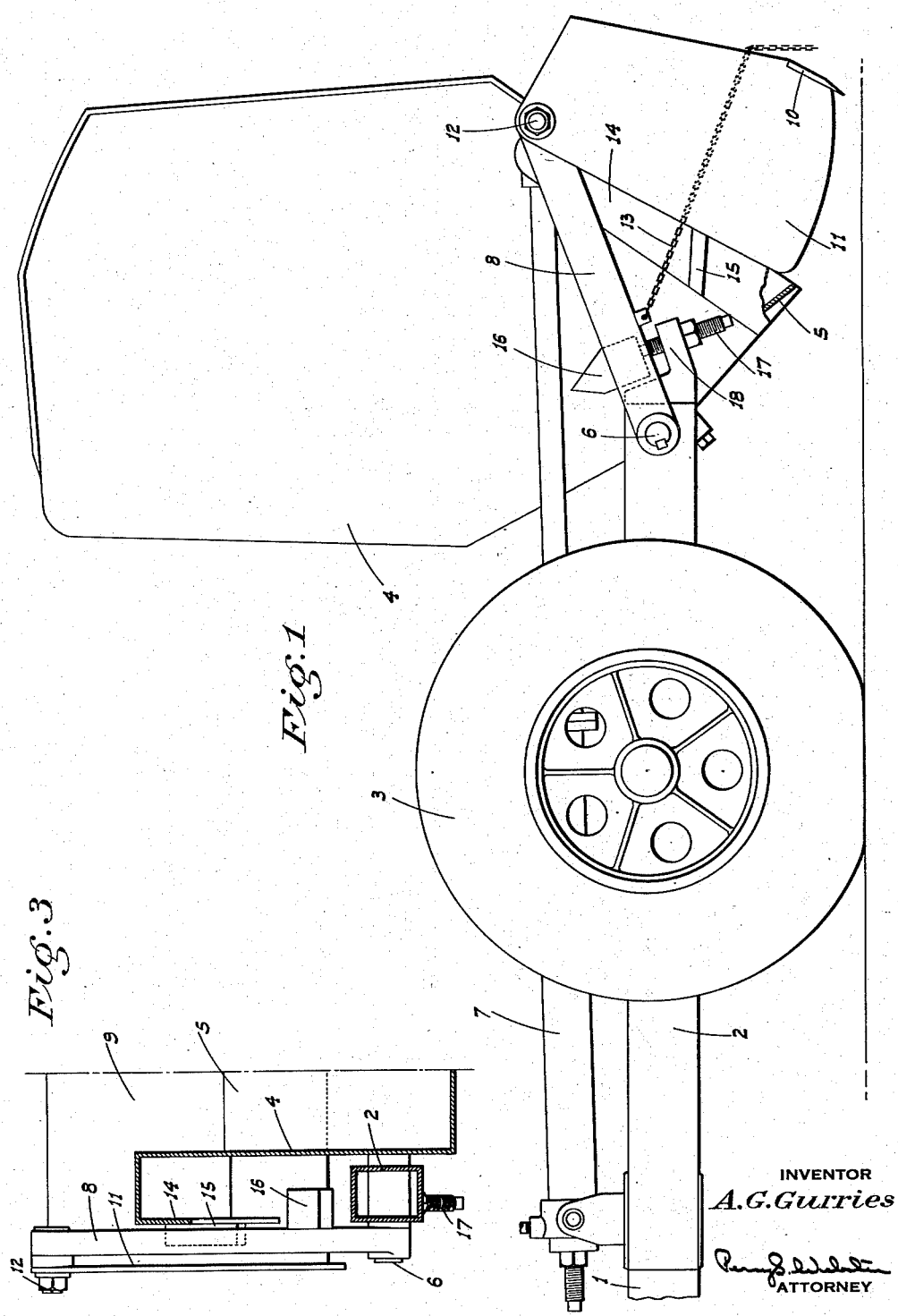
INVENTOR
A. G. Gurries
ATTORNEY

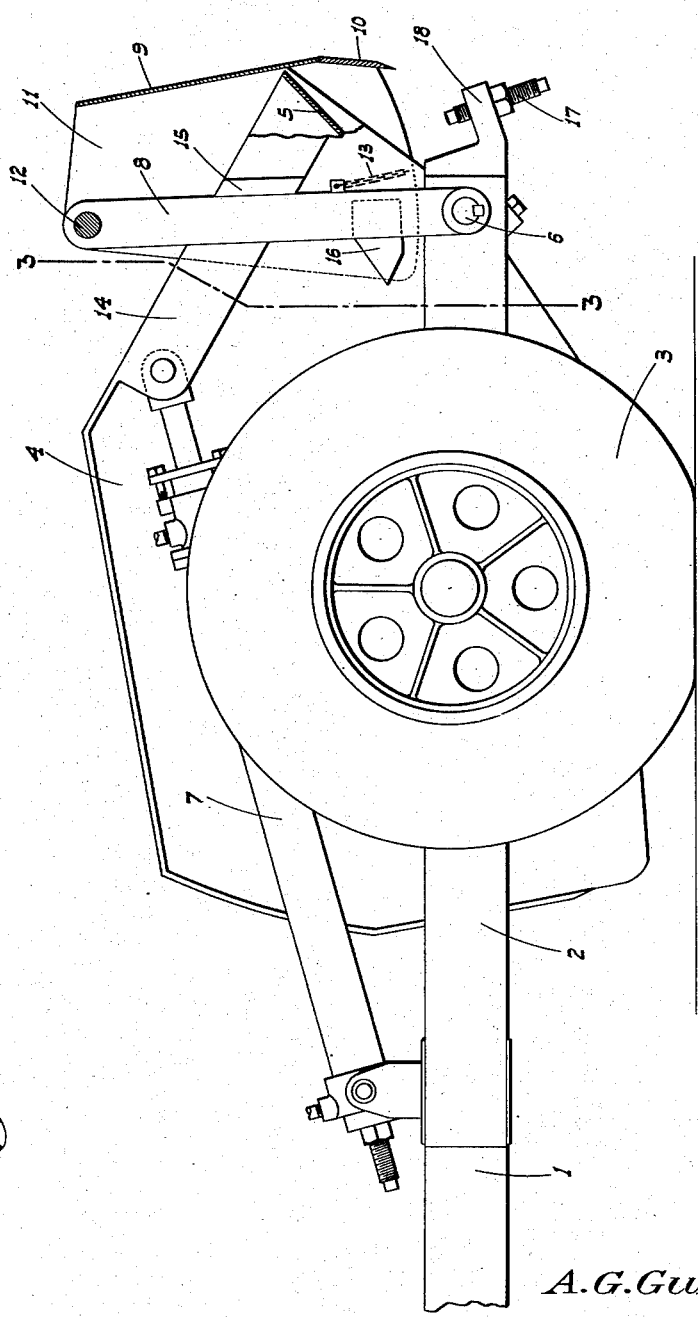

Patented June 4, 1940

2,203,616

UNITED STATES PATENT OFFICE 2,203,616

SPREADING AND GRADING ATTACHMENT FOR SCRAPERS

Albert G. Gurries, Gilroy, Calif., assignor to Be-Ge Manufacturing Company, Gilroy, Calif., a copartnership composed of Albert G. Gurries and James A. Bussert Application March 31, 1939, Serial No. 265,208

13 Claims. (Cl. 37—129)

This invention relates to carrying scrapers of the rear discharge type and particularly represents improvements over the scraper shown in my copending application No. 254,878 filed February 6, 1939.

The scraper of this application was only designed and adapted to discharge its load in a heap, and spreading or leveling of the discharged load, if such was desired, necessitated the use of another implement.

It is therefore the principal object of this present invention to provide the scraper with a grading and spreading attachment, adapted to move into working position automatically as the bowl is tilted to a dump position, and to be returned automatically to its normal inactive position by the return of the bowl to a scraping or carrying position.

A further object is to provide a simple form of adjustable stop means to control the setting of the spreading device for any spreading or grading depth desired, without having to resort to an accurate control of the bowl movement to effect such setting.

At the same time, the attachment may be readily made inoperative without removing the same from the scraper, in the event that an unspread discharge of the load is desired.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 1 is a side elevation of the scraper equipped with my spreading attachment, the bowl being tilted to dump and the attachment being in operative position.

Figure 2 is a similar view partly in section, showing the bowl as being returned to a scraping position and with the attachment raised to its normal inoperative position.

Figure 3 is a fragmentary transverse section on line 3—3 of Fig. 2.

Referring now more particularly to the characters of reference on the drawings, the frame of the scraper includes spaced side beams 2 supported intermediate their ends by wheels 3. At its forward end, the frame is adapted for supporting connection with a tractor.

The bowl 4 of the scraper is disposed between the side beams and includes a back plate 5. The bowl is pivotally supported from the side beams at their rear end by a cross shaft 6 turnably mounted in said beams and extending under the back plate intermediate its ends, as in said copending scraper.

The back plate is arranged relative to the shaft so that when the bowl is tilted upwardly and rearwardly to a dumping position, the back plate will be disposed with an upward and forward slope from its then lower end, as shown in Fig. 1.

The bowl is swung from one position to the other by hydraulic units 7 as before.

The spreading and leveling attachment, which is applied to a scraper of the above general construction, comprises arms 8 extending upwardly from and secured on shaft 6 outwardly of side beams 2. A grading plate 9 having a blade 10 on its lower end, is disposed rearwardly of the arms and is provided with side wings 11 which overlap the arms on the outside and are pivoted on the upper end of the same as at 12. Releasable chains 13 or similar flexible elements connect the plate and arms near their lower end and are set to allow a predetermined rearward swing of the plate relative to the arms as shown in Fig. 1.

The length of arms 8 is such that their upper end is above the adjacent portion of the bowl when the arms are upstanding and the bowl is in scraping or carrying position; while the depth of the plate and blade unit from the pivot connection of the same with the arms is such that when the arms and bowl are in the above position, the plate will lie against and depend below the then upper edge of the back plate 5 of the bowl. The plate is thus in position to be engaged and swung back by the dirt in the bowl when the latter is swung to a dumping position, and this dirt pressure plus the rearwardly disposed weight of the grader plate, naturally tends to cause the arms to swing rearwardly also.

Projecting laterally out from the reinforcing side flanges 14 of the bowl behind the arms but in the path of the same are lugs 15. These engage the arms and control the rearward swinging of the same from a normal upstanding position as the bowl is swung rearwardly. With such movement of the arms, the spreader plate also swings rearwardly relative thereto, until stopped by the chains.

When the arms have swung so as to dispose the blade 10 at a predetermined distance from the ground, and which is before the bowl has been tilted to a full dumping position, further swinging is arrested by the engagement of blocks 16 on the arms with stop screws 17. These are adjustably mounted on brackets 18 secured on the side beams 2 rearwardly of shaft 6 in such a position as to be substantially at right angles to the arms when engaging the blocks. It will thus be seen that by advancing or retracting the screws, the angle of setting of the arms relative to the ground will be altered. This in turn alters the height of the rear end of the arms from the ground, and consequently the distance of the grading blade from the ground.

With further tilting and lowering of the back plate of the scraper to a full dump position, the lugs 15 move away from the screw supported arms, and the load is discharged ahead of and against the grading plate and blade unit, which is already in position, and such dirt is also confined between the side wings 11, which still overlap the sides of the bowl somewhat and prevent lateral movement of the discharged dirt beyond the zone of action of the grader.

If, however, a grading or spreading action is not wanted, it is only necessary to release chains 13, which allows the grader unit to swing without restriction and pass over the heap of discharged dirt with the forward movement of the scraper. When the load has been discharged and spread, return tilting of the bowl causes lugs 15 to again engage the arms and swing the same up; the spreader unit swinging forwardly of itself as the arms are lifted until plate 9 reengages the bowl.

Due to the natural rearward overhang of the spreader unit relative to the arms, the latter will tend to remain in contact with the lugs 15 even when the arms are vertically disposed. Should the weight become forwardly unbalanced and the arms swing ahead of the lugs, such swinging movement is limited by the engagement of the blocks 16 at their forward end with the upper face of beams 2, since said blocks overhang the beams.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In a scraper, a rear-dump bowl, means pivoting the bowl for tilting movement between scraping and dumping positions, means to thus tilt the bowl, a grading blade, means mounting the blade on the scraper for movement in a downward direction from a normally raised position, means between the bowl and blade mounting means to cause the blade to be lowered to an operative position behind the bowl as the latter is tilted toward a dumping position and with such tilting movement and forwardly projecting side wings rigid with the blade and overlapping the sides of the bowl at the rear end thereof.

2. In a scraper, a rear-dump bowl, means pivoting the bowl for tilting movement between scraping and dumping positions, means to thus tilt the bowl, a grading blade, means mounting the blade on the scraper for movement in a downward direction from a normally raised position, and so that the blade tends to lower of itself to an operative position behind the bowl and means between the bowl and the blade mounting means to restrain the movement of the blade to such position until the bowl has tilted a predetermined distance toward a full dump position but before the bowl reaches such position.

3. A structure as in claim 2 with stop means limiting the downward movement of the blade after the restraining means has ceased to function with the continued tilting movement of the bowl beyond said predetermined distance.

4. In a scraper, a rear-dump bowl, means pivoting the bowl for tilting movement between scraping and dumping positions, means to thus tilt the bowl, normally upstanding side arms pivoted on the scraper adjacent but ahead of the rear end of the bowl, a grading blade supported from the upper end of the arms and disposed rearwardly thereof in such relation thereto as to cause the arms to swing rearwardly and lower the blade and lugs on the bowl above the pivot thereof and behind the arms to engage the same and prevent such swinging of the arms until the bowl is tilted rearwardly a predetermined amount from a scraping position, and to swing the arms upwardly with the return tilting of the bowl.

5. A structure as in claim 4, in which the arms are mounted coaxial with the pivot of the bowl.

6. A structure as in claim 4, with stop means limiting the downward swinging movement of the arms without interfering with further rearward tilting of the bowl.

7. In a scraper, a rear-dump bowl, means pivoting the bowl for tilting movement between scraping and dumping positions, means to thus tilt the bowl, normally upstanding side arms pivoted on the scraper adjacent but ahead of the rear end of the bowl, a grading blade disposed rearwardly of and below the upper end of the arms, side wings rigid with the blade and pivoted on the arms at their upper end whereby a rearward pressure is exerted on the arms tending to swing them rearwardly, and means between the arms and bowl to restrain such swinging of the arms until the bowl is tilted from its scraping toward the dumping position, and to swing the arms upwardly with return tilting of the bowl from a dumping position.

8. In a scraper, a rear-dump bowl, means mounting the bowl for tilting movement between scraping and dumping positions, means to tilt the bowl, normally upstanding side arms pivoted on the scraper adjacent the rear end of the bowl, a grading blade disposed below the upper end of the arms, means mounting the blade in connection with the arms at their upper end, the latter tending to swing rearwardly by rearward pressure against the blade, means between the arms and bowl to restrain such swinging of the arms until the bowl is tilted from its scraping toward the dumping position and adjustable stop means limiting the downward swinging of the arms independently of the bowl.

9. A structure as in claim 7, with a back plate upstanding from and rigid with the blade; said plate, when the arms are swung up, substantially engaging and extending above the back end of the bowl.

10. In a scraper, a rear-dump bowl, means mounting the bowl for tilting movement between scraping and dumping position, means to tilt the bowl, normally upstanding side arms pivoted on the scraper adjacent the rear end of the bowl, a grading blade disposed below the upper end of the arms, means pivoting the blade in connection with the arms at their upper end for rearward swinging movement relative to the arms, the latter tending to swing rearwardly by pressure against the blade, means between the arms and bowl to restrain such swinging of the arms until the bowl is tilted from its scraping toward the dumping position and flexible elements connecting the arms and blade to limit rearward swinging of the blade relative to the arms.

11. In a scraper, a rear dump bowl, means pivoting the bowl for movement between scraping and dumping position, means to thus tilt the bowl, a grading blade, means mounting the blade on the scraper for movement in a downward direction from a normally raised position, means between the bowl and blade mounting means to cause the blade to be lowered to an operative position behind the bowl with the tilting movement of the latter toward a dumping position, and a back plate rigid with and upstanding from the blade, said plate, when the bowl is in non-tilted position and the blade is raised, substantially engaging and extending above the back end of the bowl.

12. In a scraper, a rear dump bowl, means pivoting the bowl for movement between scraping and dumping positions, means to thus tilt the bowl, a grading blade, swingable normally upstanding arms mounting the blade on the scraper for downward and rearward movement from a normally raised position, a back plate rigid with and upstanding from the blade, said plate, when the bowl is in non-tilted position and the blade is raised, substantially engaging and extending above the back end of the bowl, whereby the pressure of the dirt in the bowl against the plate will tend to cause the arms to swing down, and means between the bowl and arms to prevent such dirt pressure from being effective until the bowl tilts and also serving to return the blade to a raised position after being lowered with the return tilting movement of the bowl from a dumping position.

13. A structure as in claim 12 in which said last named means comprises lugs projecting laterally from the bowl behind and engaging the arms.

ALBERT G. GURRIES.